(12) United States Patent
Wilburg et al.

(10) Patent No.: US 9,301,659 B1
(45) Date of Patent: Apr. 5, 2016

(54) HIGH EFFICIENCY EVAPORATIVE/DEHYDRATION TOILETS

(71) Applicants: Jerry Duane Wilburg, Broken Arrow, OK (US); Lawrence James Losoncy, Tulsa, OK (US); Ted Knight, Arlington, VA (US)

(72) Inventors: Jerry Duane Wilburg, Broken Arrow, OK (US); Lawrence James Losoncy, Tulsa, OK (US); Ted Knight, Arlington, VA (US)

( * ) Notice: Subject to any disclaimer, the term of this patent is extended or adjusted under 35 U.S.C. 154(b) by 92 days.

(21) Appl. No.: 13/975,028

(22) Filed: Aug. 23, 2013

Related U.S. Application Data

(63) Continuation-in-part of application No. 12/837,999, filed on Jul. 16, 2010, now abandoned.

(60) Provisional application No. 61/692,288, filed on Aug. 23, 2012, provisional application No. 61/225,980, filed on Jul. 16, 2009.

(51) Int. Cl.
*A47K 11/02* (2006.01)

(52) U.S. Cl.
CPC ............... *A47K 11/02* (2013.01); *A47K 11/023* (2013.01)

(58) Field of Classification Search
CPC .................................................. A47K 11/023
See application file for complete search history.

(56) References Cited

U.S. PATENT DOCUMENTS

| | | | |
|---|---|---|---|
| 3,921,228 A | 11/1975 | Sundberg | |
| 4,044,406 A | 8/1977 | Hargraves | |
| 4,174,371 A | 11/1979 | Bell et al. | |
| 4,608,175 A | 8/1986 | Nuttle | |
| 5,152,074 A * | 10/1992 | Kishi | .............................. 34/247 |
| 5,276,924 A | 1/1994 | Hachima | |
| 5,996,136 A | 12/1999 | La Trobe | |
| 2008/0295237 A1 | 12/2008 | Kurtz | |

* cited by examiner

*Primary Examiner* — Janie Christiansen
(74) *Attorney, Agent, or Firm* — Nixon & Vanderhye P.C.

(57) ABSTRACT

A high efficiency evaporative toilet provides a unique air introduction and exposure/utilization system providing a unique air flow pattern that draws hot air over solids and then over liquids for absorption of moisture in three different technological options. An expansion of the liquid surface exposed to hot air is achieved through the use of wicking in the carousel and microwave applications. An air exhaust system provides a unique exhaust flow system that draws saturated air out of the system and is operated nonstop, using minimal amounts of electricity with the added option of being compatible with the use of solar panels.

4 Claims, 9 Drawing Sheets

Flow and Mechanical Diagram of the PSI Waste Disposal System

Flow and Mechanical Diagram of the PSI Waste Disposal System

HIGH EFFICIENCY EVAPORATIVE/DEHYDRATION TOILETS

CROSS-REFERENCE TO RELATED APPLICATIONS

This application claims the benefit of U.S. Provisional Application No. 61/692,288 filed Aug. 23, 2012, and is a continuation-in-part of U.S. patent application Ser. No. 12/837,999 filed Jul. 16, 2010, which claims the benefit of U.S. Provisional Application No. 61/225,980 filed Jul. 16, 2009. Each of these prior applications is incorporated herein by reference.

FIELD

The technology herein relates to an environmentally-conscious self contained waste disposal system, and more particularly to an evaporative toilet system that receives human waste, evaporates liquids and moisture from the solids such that the solids get dried and reduced in volume for sanitary and environmentally sound disposal, and eliminates the liquids by evaporation.

BACKGROUND AND SUMMARY

Throughout history, the management of human waste has evolved to eliminate odor, reduce the chance for the spread of disease and pathogens, and provide less offensive waste removal.

The flush toilet virtually revolutionized civilization. Waterborne sanitation is often seen as the normal method for the disposal of human waste. Due to its "flush and forget" nature, it is often seen as the ideal solution for many applications. However, the strain on precious water resources and aquifers should not be underestimated. One person on average creates 550 liters of human waste every year. Over the course of a year, to flush away the 550 liters of human waste in a waterborne system requires approximately 15,000 liters of water. Added to this is the high cost of and need for, maintenance of the treatment plants and reticulation systems.

Not all situations can provide the running water and sewer or septic system required to support flush toilets. For example, campgrounds, cabins, recreational areas, remote areas, sports fields, fishing camps, marinas, construction sites, military venues and many other situations often require sanitation but do not have the infrastructure to support traditional flush toilets. In the nation's parks, recreation areas and campgrounds, waterborne sanitation is not always feasible due to water shortages or unavailability, pollution, costs, climatic conditions and impractical applications. The situation is even worse in less development countries.

The result has been the pursuit of alternative forms of sanitation such as pit latrines, composting toilets, chemical toilets and incendiary toilets. Each of these has its flaws. For example, many outdoor venues have pit latrines or porta-johns that need to be pumped periodically. Such arrangements are often odiferous and inconvenient and costly to maintain. It would be highly desirable to replace such systems with less costly designs that are easy to install and maintain and offer reduced odor.

Some in the past have developed evaporative toilets based on the concept that air can be used to evaporate moisture from the human waste, thereby reducing volume and pathogens. Unlike a conventional flush toilet which removes and relocates waste to a waste treatment installation such as a septic system or community treatment center, an evaporative toilet provides more self-contained non-discharge waste processing. Such designs are therefore more naturally suited for use in places where little or no waste removal and processing infrastructure is in place. Evaporative toilets work where there is no water, where the ground is rocky, on hills and mountains and with elevated or non-elevated structures and on shorelines. They are ideal for cabins, lodges, recreational and rest areas where there is no water for conventional sanitation. They were designed to mitigate sanitation-borne diseases and because the waste is dried rapidly (and possibly also due to aerobic bacteria effects), the pathogen levels are extremely low.

The waterless dehydration/evaporation toilet system thus provides a non-polluting, environmentally friendly, cost-effective and low maintenance solution to human sanitation. It offers a standard of respectability and convenience, comparable to a waterborne system, yet without the prohibitive costs and obvious strain on precious water resources.

One example of non-limiting evaporative toilet design provides dry sanitation in a sealed, zero-discharge unit that is driven by radiant heat and/or wind power. Such example non-limiting embodiments provide a solution to many areas confronted by sanitation problems. The human solid waste entering the unit is quickly separated from the urine, which is evaporated into the atmosphere. The solids, by a process of dehydration, dramatically reduce in volume. There are no odors and the material removed (for example, every two to three years or at other intervals, depending on number of users) is virtually pathogen free. Some non-limiting embodiments do not require chemicals, other additives or electricity. If over used, the liquids can be easily pumped and the evaporative process will begin again. Such systems are suited for remote areas such as campgrounds, where no electricity is available and only the sun and wind are available as energy sources.

As evaporative toilets have experienced increased use, it has become evident that further improvements in efficiency are both desirable and needed. In particular, an evaporative toilet unit installed in a low usage environment such as a single family cabin or vacation home may give long term trouble-free reliable service. That same unit installed in a popular campground, state park or other high usage area may experience significant problems. For example, an evaporative toilet unit installed in a high density area of a camp or campground may not be capable of processing high volumes of waste in short amounts of time, and thus may need pumping or other attention that it would be desirable to avoid.

Challenges for high efficiency evaporative toilets include: a need to remove moisture quickly and thoroughly from solids in order to eliminate the danger of disease and unpleasant odors; the need to evaporate liquids rapidly without putting anything into the ground; and the need to accommodate a large enough volume to make the system viable for general use in high usage environments.

Factors that influence the rate of evaporation include temperature, barometric pressure, relative humidity, and in some designs, wind velocity. For example, evaporating water requires 540 calories of energy per gram to let the water molecules move freely and evaporate. The amount of surface area exposed to moving air is an important factor in achieving higher evaporation rates. Barometric pressure affects the diffusion rate, which affects evaporation. Ambient air temperature could be much higher than that of the liquid within the unit tank, situated deeper in the ground. The higher the flow of unsaturated air over the surface of the water, the greater is the rate of evaporation. Thus, wind powered evaporative toilets generally will operate more efficiently in higher prevailing wind conditions. Additionally, higher humidity results in lower evaporation rate. Heating the air using solar heating or other heat sources can be used to artificially induce additional heat. These and other conditions affecting evaporative toilet efficiency thus include:

Positioning of the unit in relation to available direct sunlight
Number of daylight hours
Shaded hours by cloud cover
Shaded hours by trees or other buildings
Temperature achieved during the hours of sunlight
Wind velocity—ventilation
Relative humidity
Percentage concentration of liquids in the solids mass
Complications of evaluating air concentration
Partial pressure (of water) which is relative humidity.

Many of these factors are outside of the control of the designer, since they depend on local weather, seasonality, installation location and other complicating factors. Accordingly, there is a need for more efficient evaporative toilet designs that work well under a variety of different conditions to more rapidly process waste and thereby accommodate heavy use conditions.

Exemplary illustrative non-limiting evaporative toilet technology herein provides several different non-limiting embodiments and implementations offering some or all of the following and other non-limiting features, solutions and advantages:

separation of liquids from solids
rapid heating of air, said heating internal to the unit
rapid evaporation of liquids and drying (dewatering) of solids with constant circulation to said heated air.
by elimination of moisture from solids, the bacterial growth that causes decay and odor is eliminated, reducing or eliminating the production of methane gas.
requires no water or chemicals, uses a minimal amount of electricity and puts nothing into the ground
use of internally heated air to achieve said rapid evaporation
expansion of the air to liquid surface area by use of a water absorbing media to enhance evaporation
internal heat source requiring minimal use of electricity
adaptability to use of solar panel as source of electricity
portability: unit simply plugs in to electrical plug and can be attached and detached from vent much like a clothes dryer
constant air flow, pulling air away from toilet and into the exhaust vent
a unique air flow pattern that draws hot air over solids and then over liquids for evaporation of moisture
an expansion of the liquid surface exposed to hot air, achieved through the use of wicks or other such media or other mechanisms
air exhaust system: a unique exhaust flow system that draws saturated air out of the system
a carousel approach in which solids drop into separate holding cups and rotate
microwave technology that allows solids to be treated in a single containing unit
a receptacle/heater technology that allows for catchment of solids in a drying receptacle bag for easy removal
a substantially enhanced capacity that allows for multiple uses before anything needs to be removed by way of dried shrunken solids or packaged wicks used for purposes of evaporating liquids
instant on-site treatment of sanitation that puts nothing into the ground and does not require plumbing
enhanced capacity: in one non-limiting example, a single unit has the capability to handle the needs of 10 people around the clock (60 or more uses)
only a toilet seat is utilized, eliminating the need for toilets and toilet bowls such as those made of porcelain, ceramics or plastic
air exhaust system: a unique exhaust flow system that draws saturated air out of the system by a fan utilizing a solar panel or conventional sources of electricity
an evaporative toilet comprising: three different technologies as options: a carousel model, a microwave model and a simplified model
a unique enclosure with drawers for accessing used wick packages and dried solids
an air flow design that draws air into the unit from the toilet seat area
a separate chamber for heating and drying solids, and a separate chamber for evaporating liquids
an air outlet coupled to said enclosure, said air outlet permitting air to circulate through said enclosure before being exhausted from said enclosure
a fan strategically placed to create a unique airflow that pulls air through the unit, first over solids and then over liquids
a unique wicking application than provides a greatly enhanced surface for exposure of liquids and solids to air
for carousel embodiments: a unique rotating tray, a unique design of the containers comprising the carousel and a unique circuitry design that allows stepped and uniform rotations in sync with heating lights inside the unit, and unique path for the liquids as they flow towards the drying chamber.
for microwave embodiments: a unique application of microwave technology in the drying and germ-killing of sanitary solids and liquids; a unique design of the containers comprising the solids chamber and liquids chamber; a unique circuitry design that allows the operation of levered catchment of human waste and timed bursts of microwaves; a unique anti-splatter device within the unit.
for direct heating embodiments: a unique method of heating and drying liquids through the use of a combined catchment receptacle/heater strategically placed in line with continuous air flow.

The exemplary illustrative non-limiting technology herein addresses these and other challenges in a manner both different from and more efficiently than any other systems.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION OF NON-LIMITING EXAMPLE EMBODIMENTS

Figure 1:
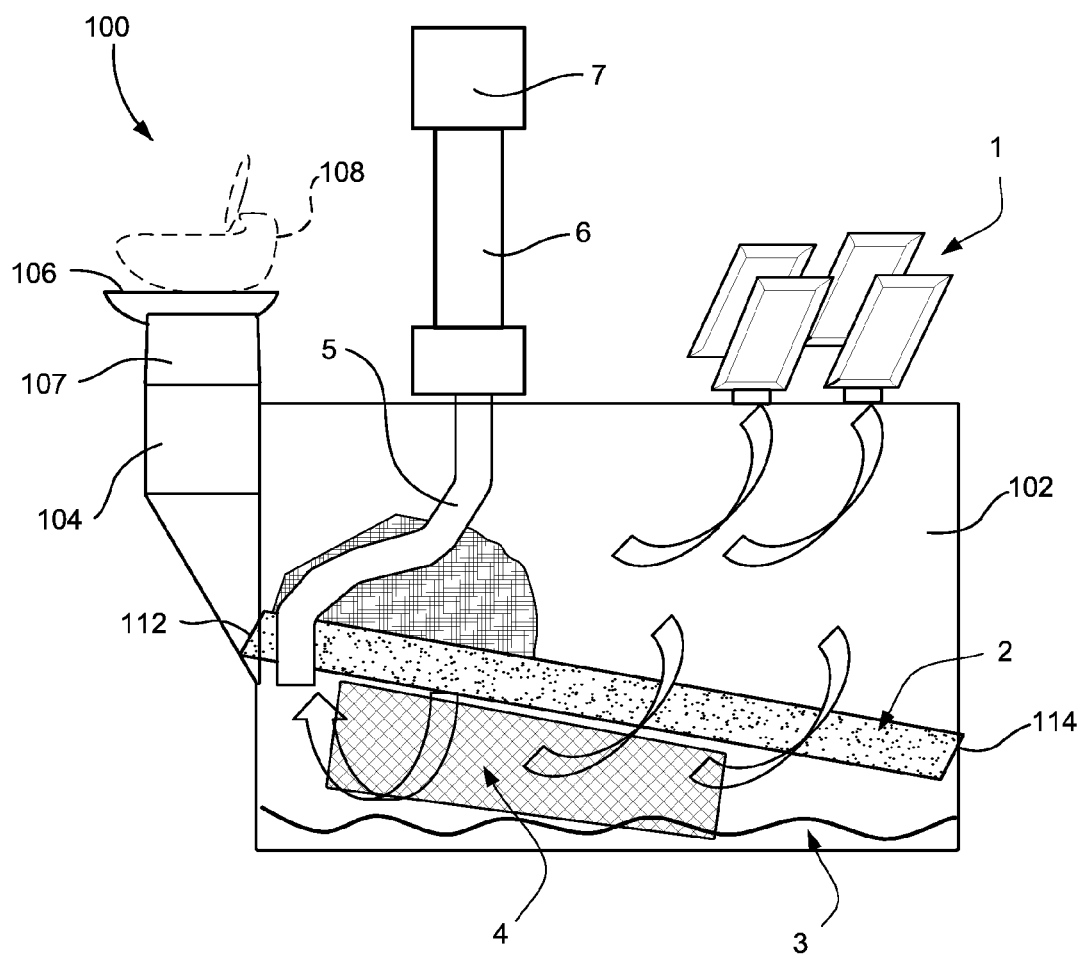
FIG. 1 shows an example non-limiting evaporative toilet design.

FIG. 1 also contained in prior application Ser. No. 12/837,999 shows an exemplary illustrative non-limiting implementation of an evaporative toilet 100. Toilet 100 is a "dry or waterless sanitation system". The form of treatment and stabilization achieved is a dehydrating process over a lengthy retention period, with an ancillary, lesser composting process that may also be used in some exemplary illustrative non-limiting implementations. The feces and urine are separated by a drying plate. The de-watered solids remain on the plate and the urine trickles through drainage holes in the front portion of the drying plate and proceeds by gravity to the liquid trap at the bottom of a tank or housing.

The FIG. 1 evaporative toilet 100 functions as a vault toilet with evaporative exhaust. It can have or use a drop toilet. Solids land on an internal drying tray running the length and width of the sealed vault. Liquids drop through to bottom of the unit. Heat from the sun creates lift even on cloudy and cold days, which turns an exhaust turbine sitting on top of the exhaust pipe above roofline. Liquids evaporate and solids dehydrate and shrink to about 10% of their original mass. The tray is slanted toward the access hatch at back end of unit for removal of dehydrated solid waste. Toilet 100 does not require flushing and that reduces the amount of liquid that needs to be evaporated. Because of the evaporation process, no treatment is needed—the liquids simply evaporate. For more details concerning the structure and operation of this non-limiting design, see related commonly-assigned U.S. patent application Ser. No. 12/837,999 filed Jul. 16, 2010, incorporated herein by reference.

Example Non-Limiting Simplified Indoor Design

Figure 2:
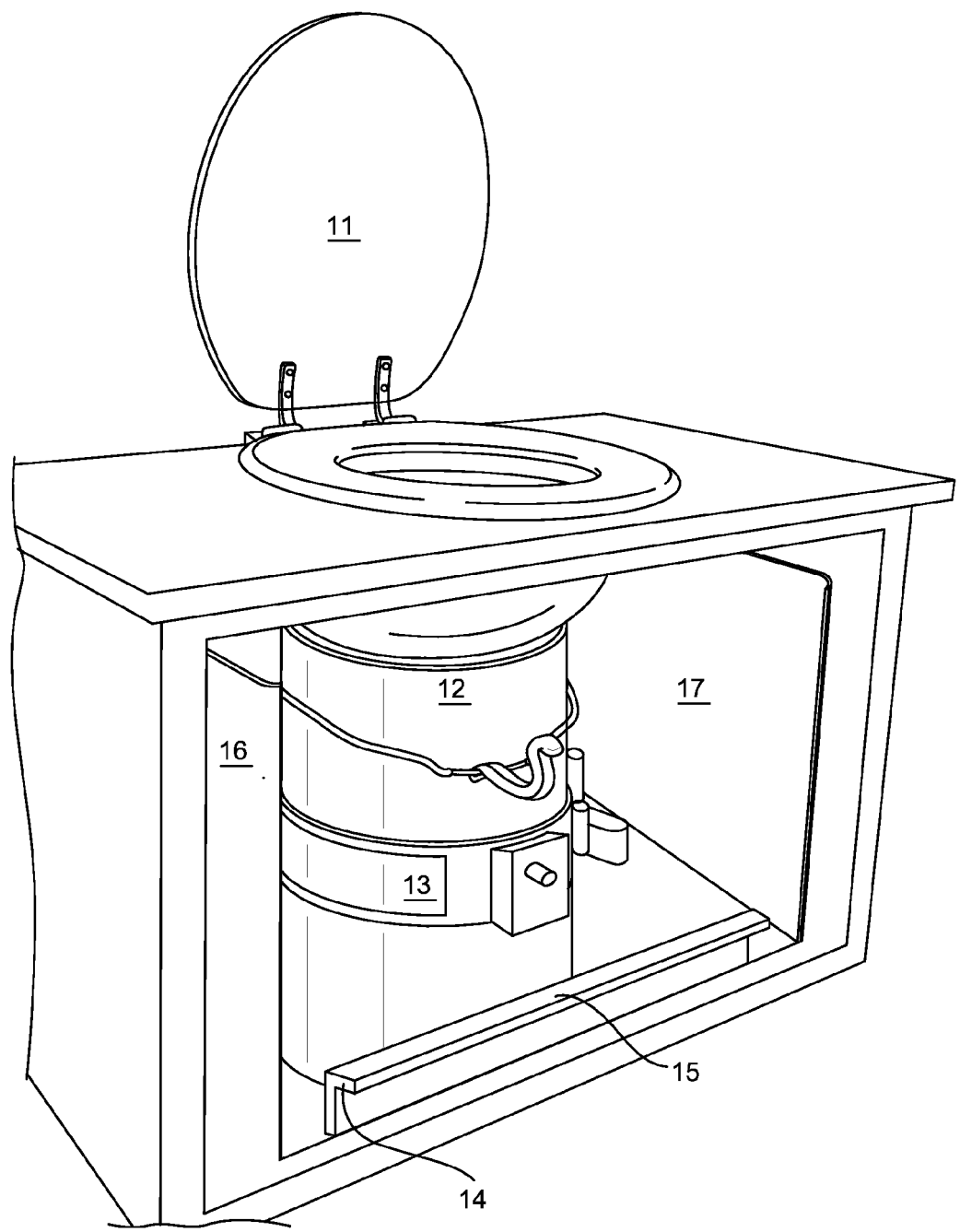
FIG. 2 shows an example non-limiting sanitizer toilet design.

The FIG. 2 example non-limiting implementation includes similar elements but is designed for interior use and so does not rely on solar and/or wind power, but rather is powered with electricity or other convenient heat source to provide both suitable air flow and heating. In this example non-limiting implementation, a toilet seat 11 rests on top of the unit. Solid waste drops into a catchment receptacle 12 with its own thermostat controlled heating element 13 set to maintain a constant sanitizing temperature to kill pathogens and evaporate liquids as they filter down to the heated sand at the bottom of this receptacle. A blower 16 runs constantly in some example implementations to maintain a constant evaporative air flow. An exhaust vent 17 allows one-way air flow down and away from the toilet, pulling odors out of the unit and into a suitable exhaust venting system. In one example non-limiting implementation, the fan runs continuously once the unit is plugged in. The heating element 13 is controlled by a thermostat that cycles to a set temperature. The heated air flows over solid waste and reduces its original mass. The sanitized waste is then ready for subsequent disposal. The unit can be run from solar panels, generators or ordinary 110 wall plugs. One example non-limiting implementation uses 110 VAC household current. "Zero Discharge Sanitation" means that no harmful effluent from the sanitation unit re-enters the environment, especially the water source. The system evaporates liquid into the atmosphere and sanitizes and dehydrates solid waste for hygienic disposal. Therefore it is a zero discharge system unlike many other sanitation systems.

Example Non-Limiting Carousel Design

Figure 3:
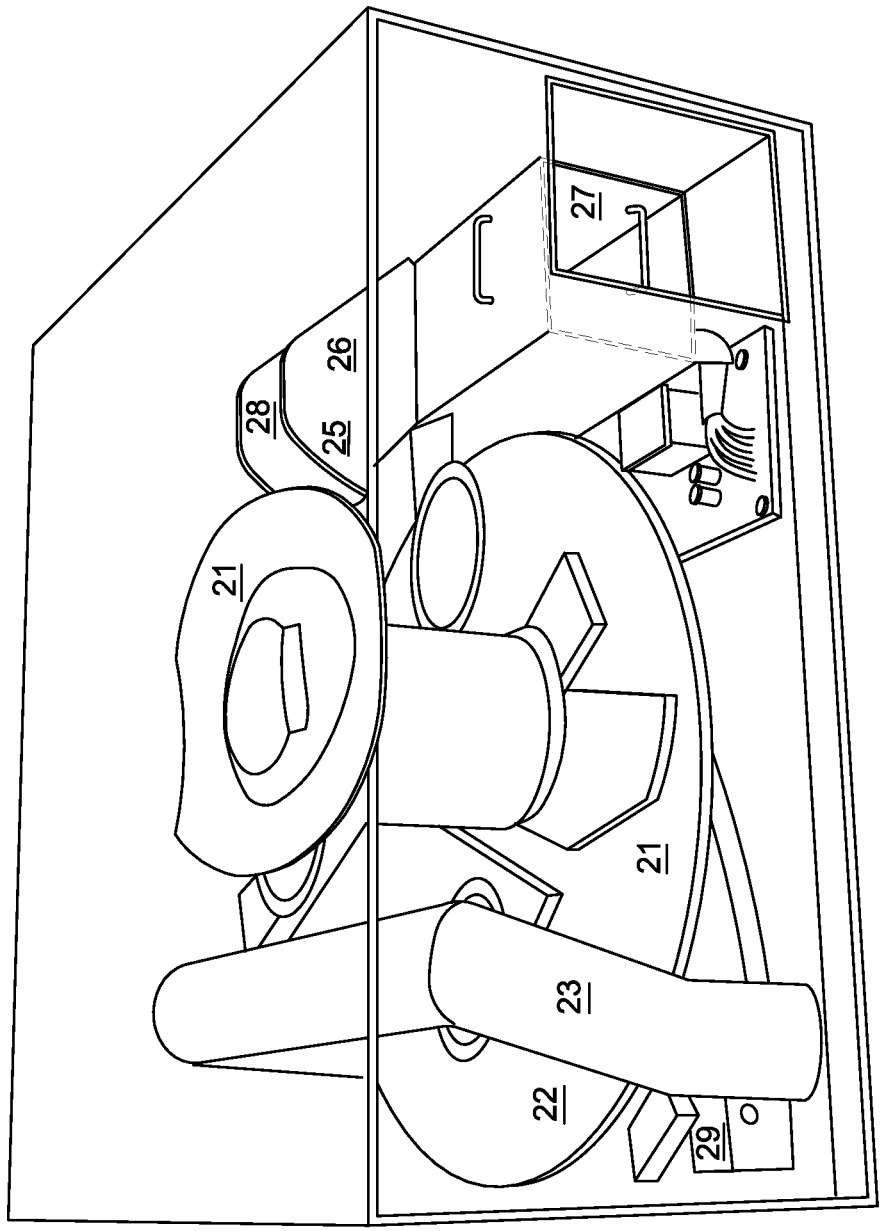
FIG. 3 shows an example non-limiting sanitizer carousel design.

FIG. 3 shows an exemplary illustrative non-limiting carousel implementation of an evaporative toilet. In this non-limiting design, a toilet seat 21 rests on top of the unit. When someone sits on toilet seat 21, an activator 29 (e.g., a pressure switch or the like engaged with the toilet set, or can also be located at the bottom right side of the unit) activates revolution of a revolving carousel 22. Revolving carousel 22 moves one position per use and in one example non-limiting design provides a rotating platform with six catchment cups that hold solids until dried and sanitized. A heating element 23 heats, sanitizes and dries solids. There is a simple circuit board for control of the Carousel model. It is a timed approach that is activated by use of the toilet, controlling the light, fan and heating elements. Such a circuit board can be controlled by a microcontroller programmed by firmware stored in a non-transitory storage device such as an EEPROM. A sensor(s) coupled to the rotating platform informs the controller when a catchment cup has moved into registry with the seat. The controller can control a brake mechanism, or the brake mechanism can be purely mechanical. An additional sensor coupled to the seat can sense when someone has sat down on the seat and when the person has stopped sitting on the seat. The microcontroller can activate the fan whenever someone sits on the seat, and can keep the fan operating for some specified amount of time after the person has stopped sitting on the seat. Similarly, the microcontroller can activate the heating source as soon as the person stops sitting on the seat, and can keep the heat source activated for a predetermined amount of time before automatically shutting off the heat source to conserve electricity.

Once the solids are dried and sanitized, they are released into a solids chamber 27. Liquids are diverted into a liquids channel 24 which runs liquids clockwise down into a liquids chamber 25. Wicking material 26 in the liquids chamber 25 absorbs liquid and reabsorbs any excess liquid accumulated in the liquids chamber, exposing it for evaporation to warm air flow. In one example non-limiting implementation, the liquids chamber 25 is a drawer that can be pulled out when it is time to change the wicking material 26. Shrunk, dried and sanitized solids are deposited in a solids chamber 27 for additional drying/shrinking of solids and subsequent removal for disposal. An exhaust vent/blower 28 draws air throughout the unit top to bottom and right to left, to dry solids and evaporate liquids.

The FIG. 3 dry or waterless sanitation system thus provides a form of treatment and stabilization achieved using a dehydrating process over a very short retention period. The feces and urine are separated by perforations in a catchment cup that collects both solids and liquids but allows the liquids to quickly drain into a collecting channel 24 and flow to a dehydrating chamber 25 at the bottom of the unit. Meanwhile, in this particular non-limiting design, with each deposit of solids, revolving carousel 22 turns one notch until on the final turn the solids are deposited into the final drying chamber 27 resting above the bottom chamber. In one example non-limiting implementation, heating element 23 may comprise or include strategically placed tiny but powerful lights, and a blower 28 maintains a constant air flow to begin the drying process while the solids are in the holding cups. The air flow continues the process over the top of the solids drying chamber 27 and through the liquids drying chamber 25. A constant air flow is provided by the exhaust fan 28 that draws air into the unit from under the toilet seat 21.

Example Non-Limiting Microwave Design

Figure 4:
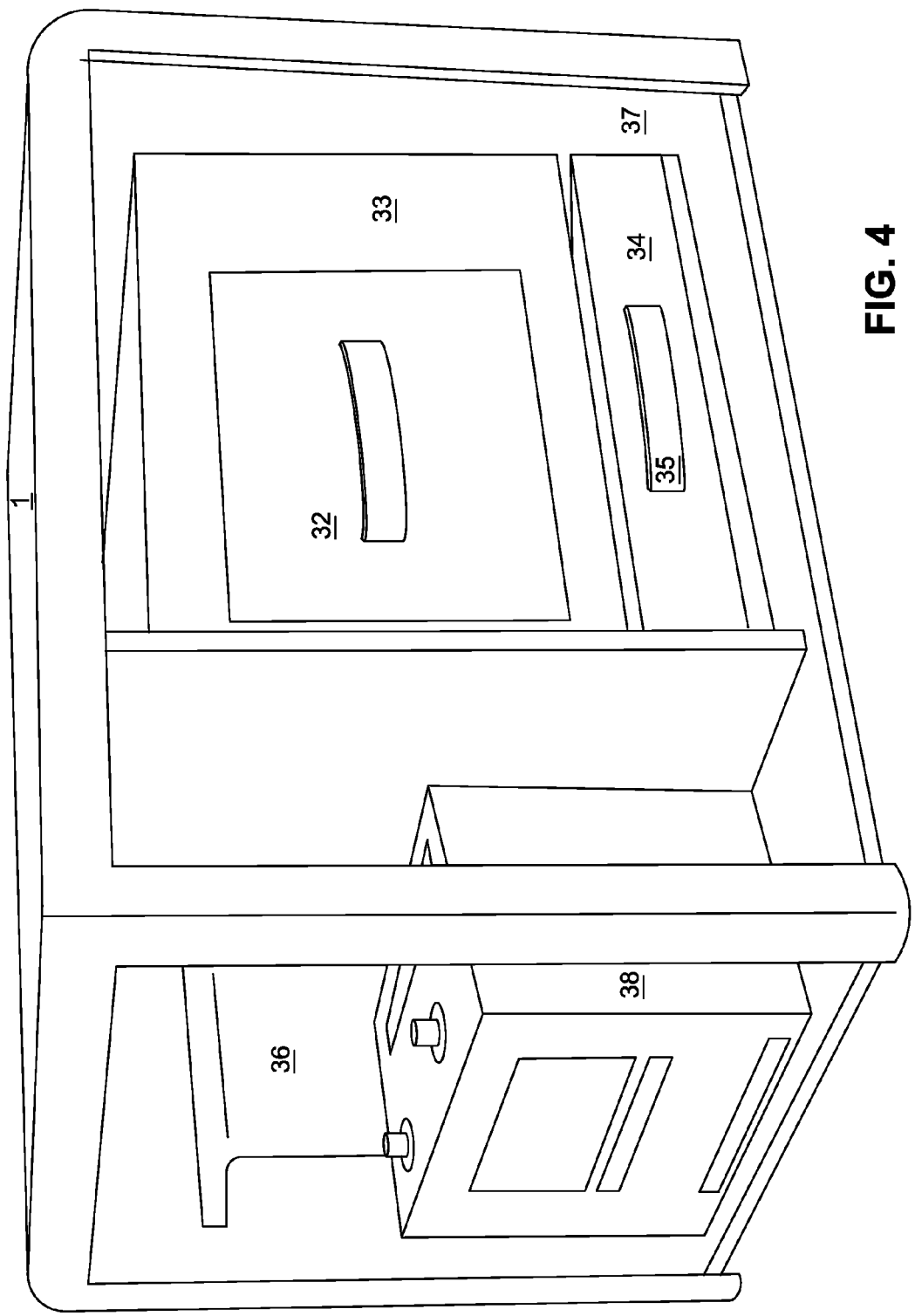
FIG. 4 shows an example non-limiting sanitizer microwave design.
Figure 5:
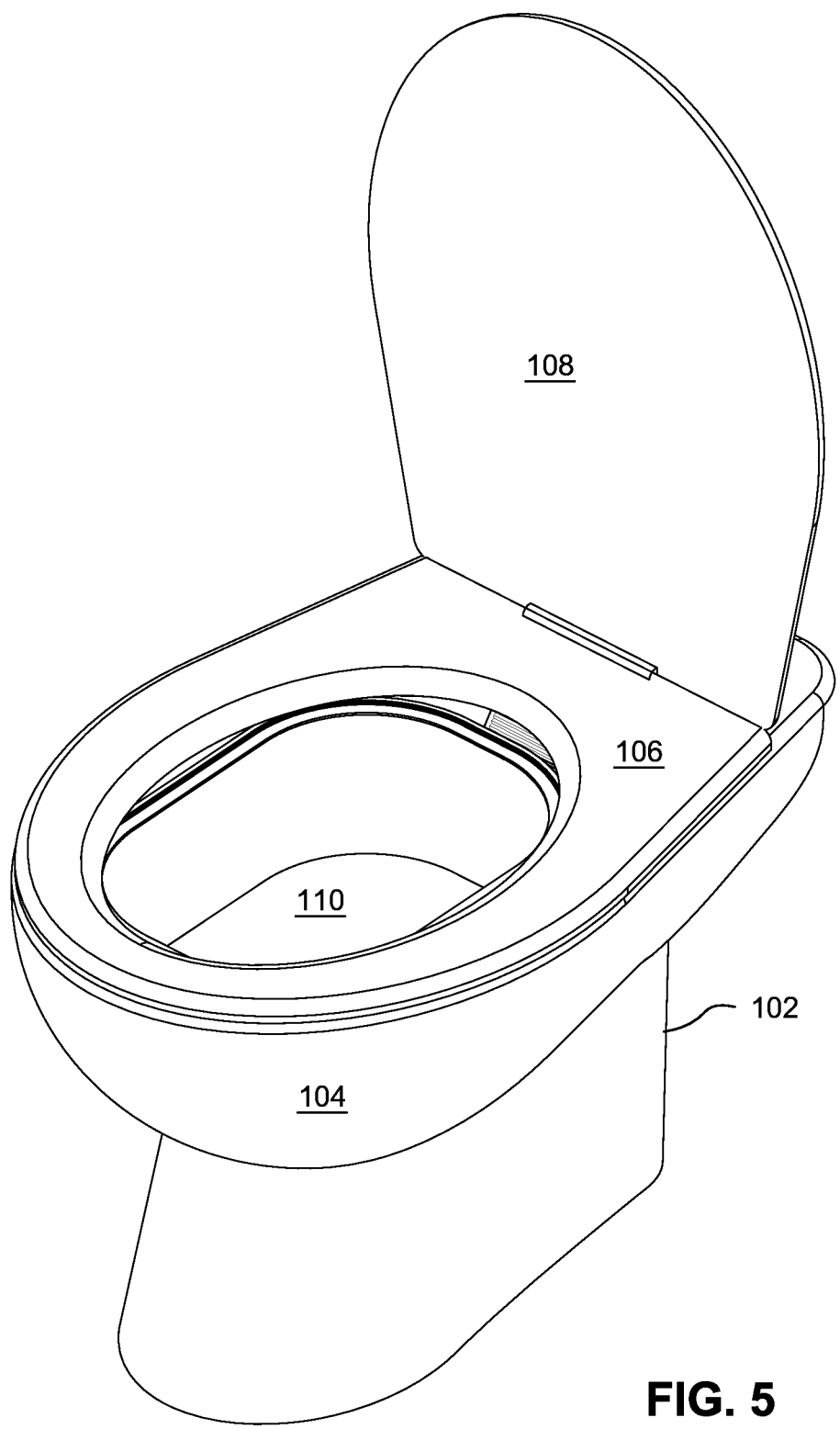
FIG. 5 shows an additional non-limiting sanitizer embodiment with the form factor of a standard toilet.
Figure 6:
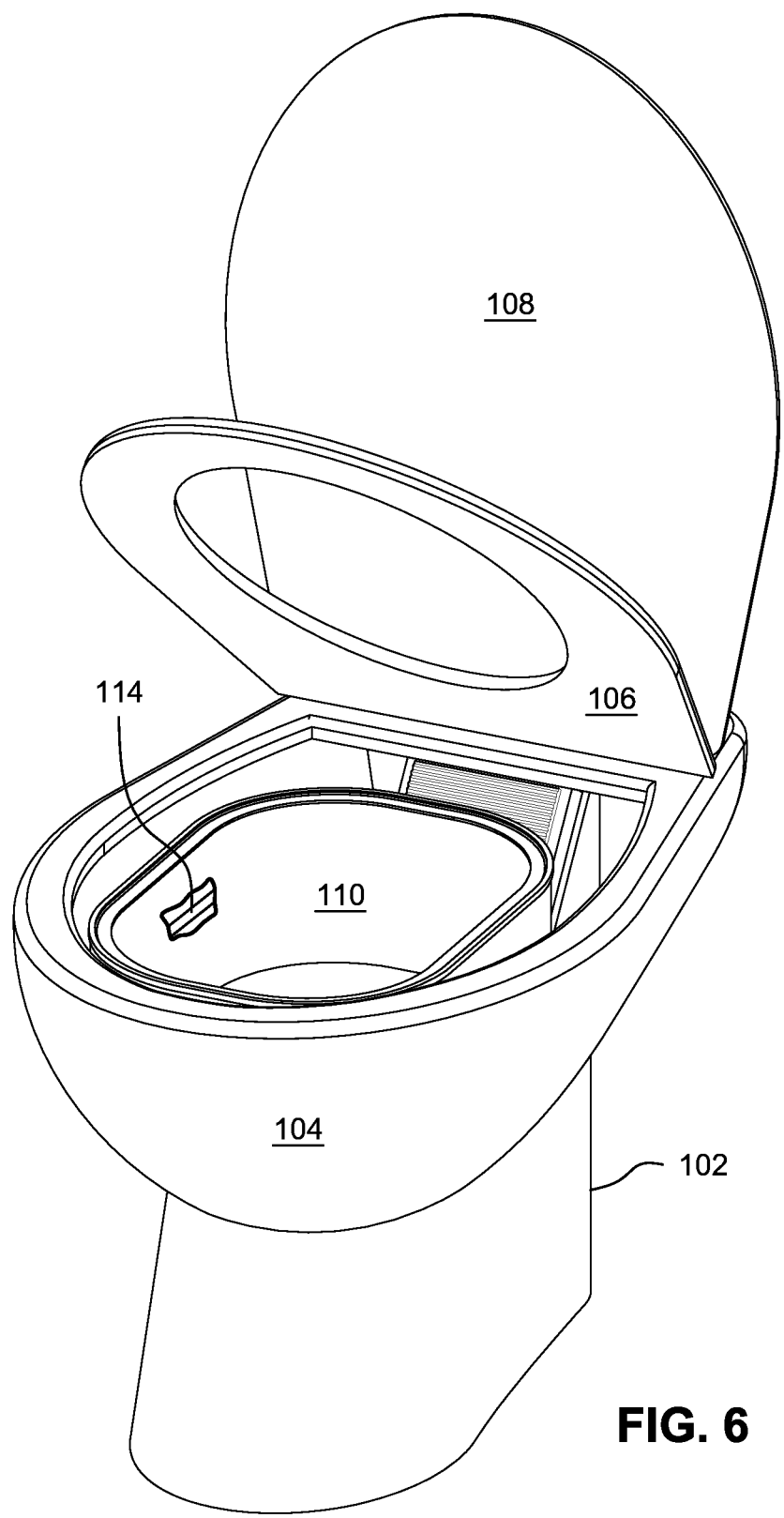
FIG. 6 shows the FIG. 5 embodiment with the seat raised to show a heated waste receptacle.

FIG. 4 shows an additional non-limiting example embodiment which uses microwaves. In this non-limiting example, a toilet seat (not shown) is at position 31 resting on top of the unit. A solids chamber 32 below the toilet seat receives solids dropped into it. A microwave element 33 kills pathogens and supplies energy to heat and dry solid waste and to evaporate liquid waste. Wicking material 35 inside liquids chamber 34 absorbs liquids and creates exposure to warm air flow. Liquids chamber 34 holds any excess liquids for re-absorption by the wicking material 35. A blower 36 provides constant air flow over solids and then over the liquids chamber 34. An exhaust vent 37 removes any possible odors that may exist during or after sanitizing. Electric power source 38 supports the microwave and blower functions.

The example non-limiting embodiment of FIG. 4 thus diverts the solids into a treatment chamber 32 that functions as an oven for short bursts of microwaves that kill the pathogens and in the process generate heat, helping to dry to sanitized material. A similar circuit board based controller approach as discussed above is taken with the microwave model, with the microwave bursts timed.

Meantime, urine drops through to wicks 35 that absorb it as it makes its way down to an overflow chamber 34. Both the solids and liquids also have a steady flow of air created by the suction of an exhaust fan 36.

In one example non-limiting implementation, a plate receives the sanitary waste deposited by human use, diverting the urine and then opening up to allow the free fall of solids into the microwave chamber 32. After many uses, both the sanitized solids and the wick package are retrievable for disposal via drawers accessible at the front of the unit. This example non-limiting implementation thus diverts solids into a treatment chamber 32 that heats the solids, while also heating air in the entire unit. Said air is then circulated over and through the liquid chamber 34 and wicking material 35 by a fan 36 that runs continuously. Used wicks 35 and dried, sanitized solids are retrieved for disposal: the solids from the top of the unit and wicking material 35 from a drawer that opens at the bottom of the unit.

Further Non-Limiting Embodiment

FIGS. 5-11 show a further embodiment that operates similarly to the FIG. 2 embodiment but is more compact and has a smaller form factor (in one example implementation the form factor can resemble a standard toilet). In the example show, a toilet housing 102 includes a lower hollow portion such as a "bowl" that is covered by a seat 106 and a lid 108. Just as in conventional toilet designs, the lid 108 can be raised to expose seat 106 where the user sits during defecation. Wastes are deposited into receptacle 110 shown in more detail in FIG. 7. In the example shown, receptacle 110 may comprise a conventional steel or other single or double-walled receptacle including an interior volume 112 that accepts the waste. The receptacle 110 is thermally coupled to an electric heating element 114 (shown in cutaway in FIG. 6) that produces heat when supplied with an electric current. Such an electric heating element 114 may produce a controlled amount of heat in either an open loop or closed loop configuration (the closed loop configuration including a temperature sensor not shown that monitors temperature within receptacle 110). In the example non-limiting implementation, a manual or computer-controlled current source (e.g., nominally 110 VAC but could be any voltage, AC or DC) supplies power to heating coil 114 to elevate the waste within receptacle 110 to a suitable (preferably constant) temperature to dry the waste within a desired time interval. The inner or the entire receptacle 110 is designed to lift out so that dried wastes can be easily disposed of such as for use in composting. In one embodiment, sand is placed within receptacle 110. Sand is preferred over kitty litter as it has a higher heat capacity and thermal conductivity.

Figure 7:
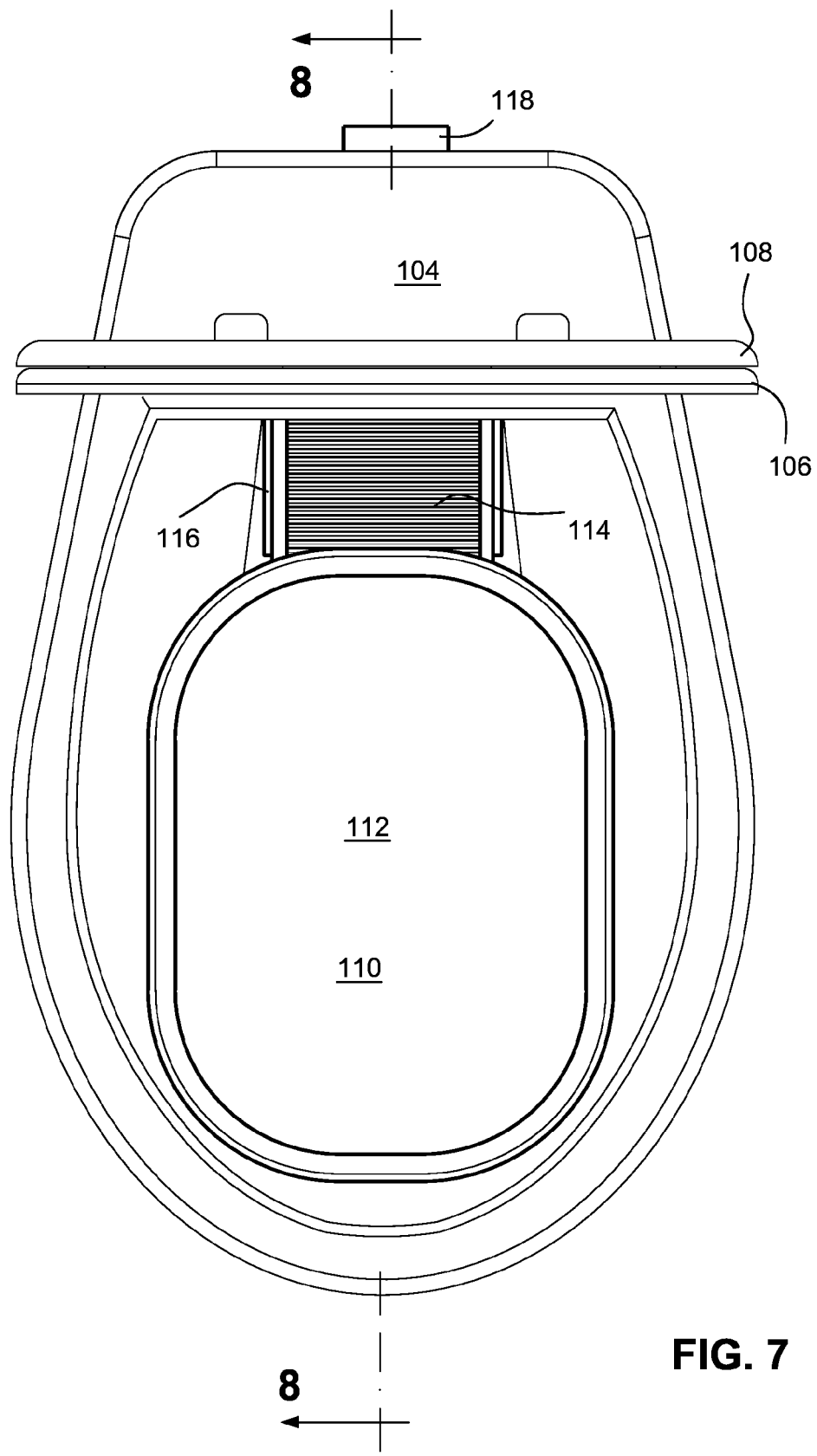
FIG. 7 shows a plan view of the FIG. 5 embodiment.

As can best be seen in FIG. 7, the sanitizer further includes a filter 114 set on top of a brace 116 that holds the filter. The filter 114 can comprise a conventional filter comprising foam or the like. Filter dimensions are 11.5"×6.5"×2.5" of highly porous low pressure drop media containing a light coat of the catalytic material. Brace 116 is in turn set on top of a blower/fan 128 (see FIG. 8) that maintains a high volume air flow through the unit. The blower/fan 128 exhausts air through a port 118 which can be coupled to a conventional venting system.

Figure 11:
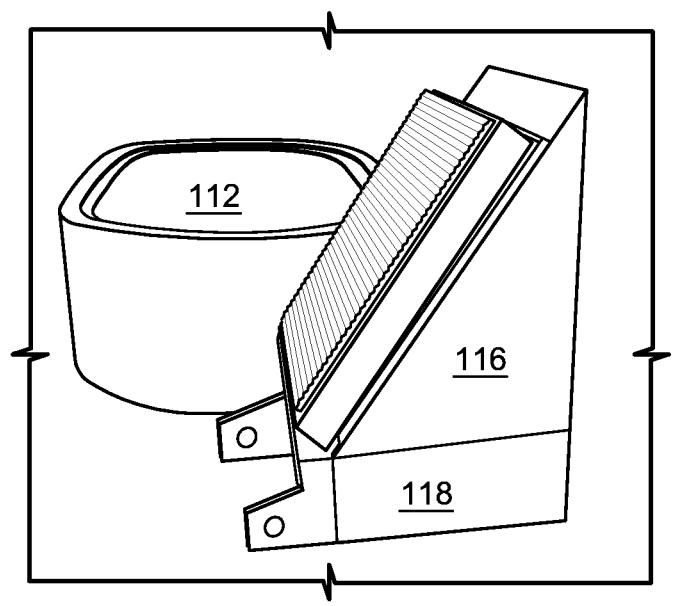
FIG. 11 shows an example internal view of a non-limiting prototype.

FIG. 11 shows an internal view of a non-limiting prototype showing relative sizes and orientations of receptacle 110 and filter 114 supported by brace 116. In the example shown, the brace 116 is in a triangular configuration to provide a planar large surface area for filter 114, thereby increasing filtered air flow. A blower 128 within the interior lower housing 118 of brace 116 provides a suitable CFM rating (40-100 CFM for example) to achieve a desired mass air flow per unit time to efficiently evaporate moisture and liquid within heated receptacle 110 and evacuate odor without generating an undue amount of noise. The blower in this example is electric powered, but in other embodiments could be wind powered or powered by any other desired means.

Figure 8:
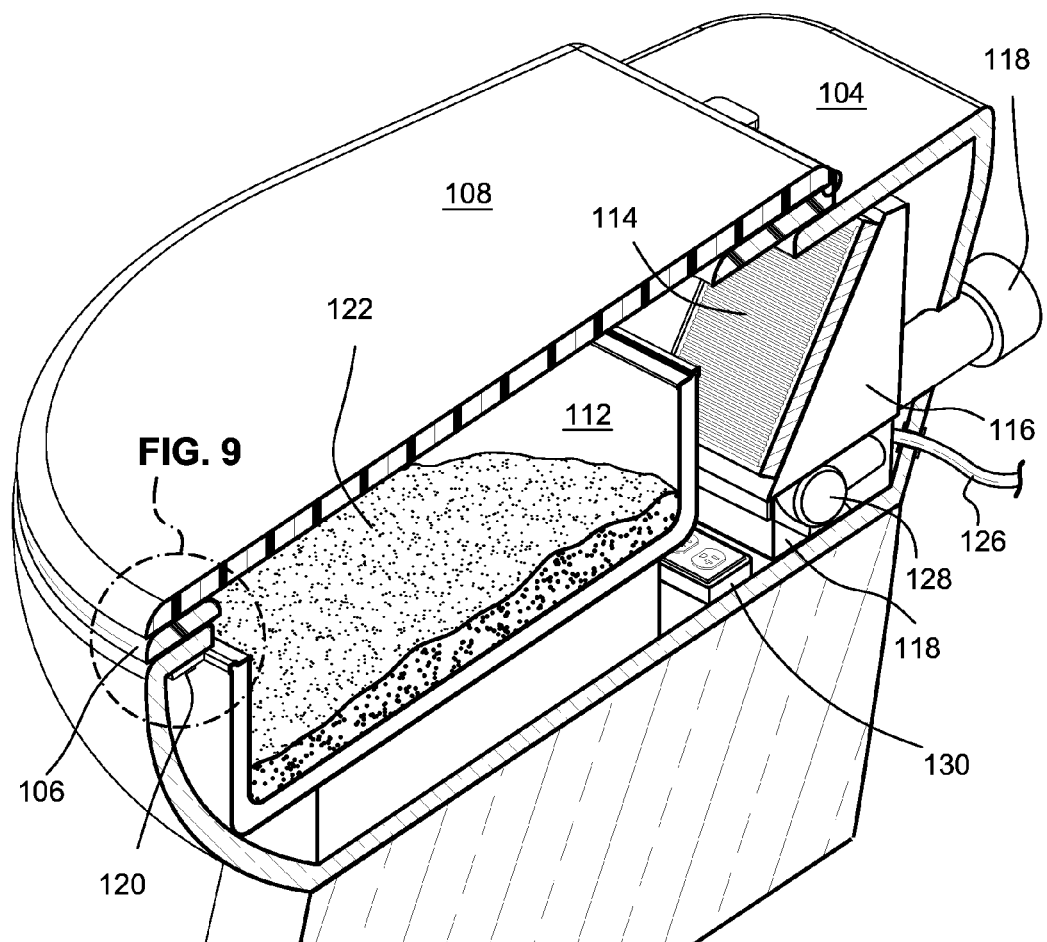
FIGS. 8 & 9 show cross-sections of the FIG. 5 embodiment illustrating light sources.
Figure 9:
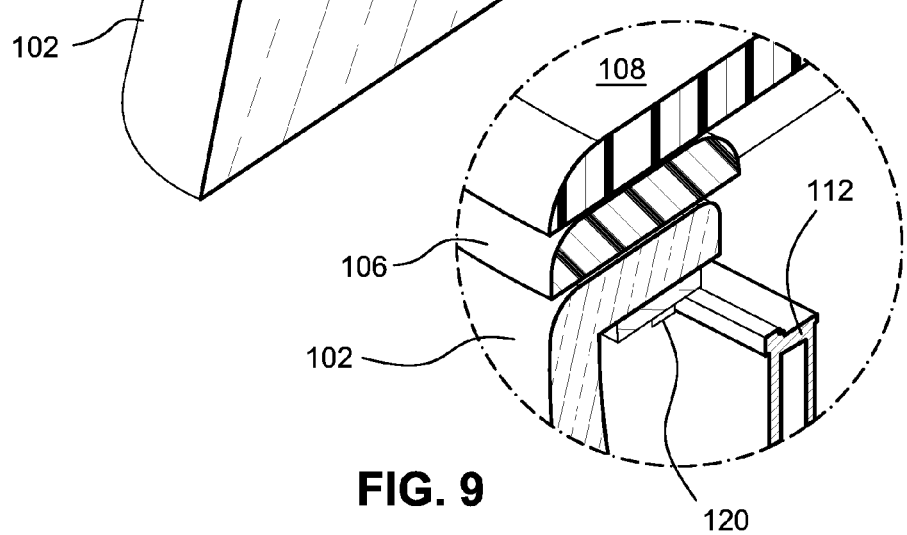
Figure 10:
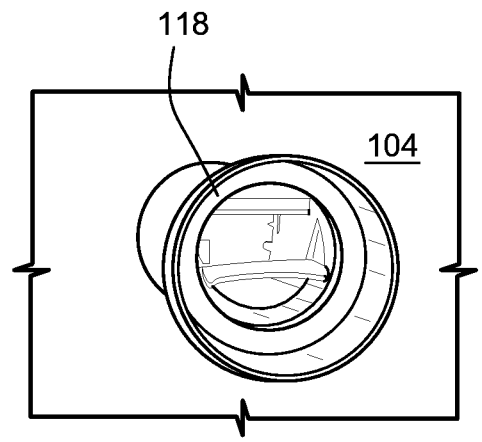
FIG. 10 shows an example non-limiting exhaust port.

FIGS. 8 and 9 show a light source 120 such as one or an array of light emitting diodes mounted across from the filter element, on the opposite side of the unit. The LED lights will generally last for approximately 50,000 hours and are used to activate the specially treated filter (see below).

In this embodiment, the lights 120 work, the sand 122 heats, the blower 128 works. Urine evaporates from receptacle 110 at the rate of about 4 to 5 uses per hour and it takes about three hours for solids to dry. No smell comes from the unit, the air flow is down and away from the seat and out of the port 118. A quiet blower 128 is used to reduce noise.

The following example steps will help maintain the non-limiting embodiment in peak performance:

Waste Removal

Empty the waste material when the toilet is full. Liquids will evaporate leaving only the solids to be emptied which will dry and shrink as part of the process. Make sure the solids are dry before emptying them.

To empty the dried solids, unplug the unit cord 126 and lift the top 106/108 open. Use gloves so as not to burn your hands. Lift out the metal receptacle 110 holding the sand and waste material. The sand and waste material can be disposed much like kitty litter. Put new sand into the metal receptacle 110 and place it back onto the heating unit, gently close the top and plug the unit back in.

Filter Replacement

About every six months or when the filter becomes too dirty for air to flow through it, the filter 114 should be replaced. One can see it is becoming dirty if it turns darker and darker, just like air filters for heating and air conditioning units. This is a specially treated filter designed to kill mold and bio organisms. The filter in one example non-limiting implementation is treated with Bio-Defender Oxititan Anti-Microbial Treatment (www.blueshieldtechnologies.com) which is a catalytic spray that uses Zinc (and perhaps Titanium) as the catalyst. Temperature and/or visable light or other radiation activates the catalyst. The surface of filter 114 is thus treated with a patented substance that kills mold, airborne pathogens and odor. It is activated by LED lights 120. This eliminates or greatly reduces both smell and airborne exhaust around the structure within which the sanitation unit is being used.

The toilet is intended to run continuously except if it is not in use for more than a few days. It will evaporate about five uses of liquids per hour. The fan 128 will constantly circulate air through the toilet, while the heater 114 will cycle on and off as needed to keep a constant temperature inside the unit.

No special type of toilet paper is required.

If the unit will not be used for a few days or longer, it can be unplugged and/or turned off after emptying the metal waste receptacle 110 to ensure that there will be no smell. It is the killing of the pathogens coupled with the fan 128 blowing air constantly through the unit and out the exhaust vent that prevents smell. If the fan stops, there will likely be odor unless the contents of the unit are emptied. In the event of a power failure, it may be desirable to empty the waste as quickly as possible in order to avoid odor.

Non-limiting advantages of this non-limiting illustrative embodiment include:
1. Convenient: compact to the point of portable. Weighs less than 60 pounds, can be easily transported (as, for example, to avoid a flood) and install mostly by being plugged into a normal 110 wall plug with simple conventional venting.
2. Environmentally sound: limited use of electricity: each model uses 110 voltage and cycles.
3. Rapid and high volume results. Each model has the capacity to evaporate about 4 uses per hour 24/7.
4. Environmentally sound: no use of chemicals, water or enzymes is required. Can use 3 inches of sand at the bottom of the waste container 110 and be emptied much like kitty litter.
5. Versatile: will work on boats, trucks, docks, in bathrooms, in outhouses—anywhere that has electricity, solar or generators.
6. Sanitary: because liquids are evaporated and solids are both heated and dried, the waste is relatively free of pathogens, much more so, for example, than septic systems.
7. Uses sand not kitty litter because sand holds and conducts heat, kitty litter does not.
8. Surface of filters is treated with a patented substance that kills mold, airborne pathogens and odor. It is activated by LED lights. This eliminates or greatly reduces both smell and airborne exhaust around the structure within which the sanitation unit is being used.
9. Surface area for catchment of solids will vary with size and capacity of unit which can be custom designed to almost any size.
10. CFM rate will also vary with size of unit. It is to be noted that the airflow is down from the toilet seat and out towards the vent.

The exemplary illustrative non-limiting process and systems exemplified above provide many interesting advantageous features including:

Air forced into the solid waste contains oxygen, a very powerful deodorizer, thereby alleviating the creation of odors.

The air flow is such as to draw air into the unit and away from the toilet seat.

There is no sludge by-product as is normal in wet sewage treatment which can be a health hazard and difficult to dispose of.

The process is far more economical than normal sewage treatment and can be easily maintained.

The sanitation unit is compact: in one example implementation, approximately 30 inches long by 20 inches high by 17 inches wide. It can be unplugged and detached from the exhaust vent and taken to high ground in the event of floods or for use elsewhere, weighting 54 pounds in one non-limiting example.

There is no assembly necessary for the use of this unit, and no "professionals" such as plumbers or electricians are necessary to get it to work. It simply plugs in like any other appliance.

Because the unit generates heat and does not need to be installed in the ground, it circumvents problems encountered in cold climates.

Because the unit runs on electricity, it does not require sunshine or wind to operate.

Because the unit uses only a tiny amount of electricity, does not use chemicals or water and discharges nothing into the ground, it is environmentally friendly beyond only being a significant water saver.

Because the unit treats sanitary waste, it allows for all other water used in any given structure to be treated as "greywater" and, therefore, enhances the environmental opportunity to recycle water, further reducing household and general water usage while also lessening the load on wastewater transport and treatment.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A compact portable evaporative toilet comprising:
a portable enclosure supporting a toilet seat communicating with an opening into the enclosure;
a thermostatically controlled electric heating element disposed in the enclosure;
an air flow design that draws air into the enclosure from an area surrounding toilet seat;
an evaporating catchment chamber within the enclosure for catching solids and liquids that fall into the enclosure through the opening, the evaporating catchment chamber heating and drying the solids and evaporating the liquids, the evaporating catchment chamber being thermally coupled to the thermostatically controlled electric heating element,
a closed loop electrical control circuit that controls the thermostatically controlled heating element to maintain a constant sanitizing temperature to kill pathogens and evaporate liquids in the evaporating catchment chamber;
an air outlet structured to couple said enclosure to an exhaust vent, said air outlet permitting air to circulate through said enclosure before being exhausted from said enclosure into the exhaust vent, the air outlet providing one-way air flow down and away from the toilet seat, thereby pulling odors out of the enclosure and into the exhaust vent; and
a blower fan placed to create an airflow that pulls air through the enclosure, over the solids and the liquids to maintain constant evaporative air flow, the blower fan running continuously whenever the toilet is operating to evaporate the liquid into the atmosphere and sanitize and dehydrate the solids for hygienic disposal,
wherein the toilet provides zero discharge sanitation that emits no harmful effluent to any water source.

2. The toilet of claim 1 wherein the electric heater comprises a combined catchment receptacle/heater placed in line with continuous air flow to heat and dry the liquid.

3. The toilet of claim 1 wherein the blower fan operates in the range of 40-100 CFM.

4. The toilet of claim 1 further comprising:
a filter disposed at the air outlet, the filter comprising a structure treated with bio-defender oxititan anti-microbial treatment, and
plural light emitting diodes optically coupled to the filter, the light emitting diodes activating the filter.

\* \* \* \* \*